United States Patent
Berger et al.

(10) Patent No.: US 7,030,404 B2
(45) Date of Patent: Apr. 18, 2006

(54) METHODS AND APPARATUS FOR HANDLING IMAGE RECORDING MEDIA

(75) Inventors: Amir Berger, Kiryat Bialik (IL); Boris Rapoport, Kiryat-Ata (IL); Jacob Koren, Haifi (IL)

(73) Assignee: Eastman Kodak Company, Rochester, NY (US)

( * ) Notice: Subject to any disclaimer, the term of this patent is extended or adjusted under 35 U.S.C. 154(b) by 325 days.

(21) Appl. No.: 10/431,350

(22) Filed: May 7, 2003

(65) Prior Publication Data

US 2004/0031939 A1  Feb. 19, 2004

Related U.S. Application Data

(60) Provisional application No. 60/383,748, filed on May 28, 2002, provisional application No. 60/376,712, filed on May 7, 2002.

(51) Int. Cl.
*G03B 42/08* (2006.01)

(52) U.S. Cl. ........................ 250/589; 378/414

(58) Field of Classification Search ................ 250/589, 250/484.4, 484.2, 483.1, 482.1; 378/414
See application file for complete search history.

(56) References Cited

U.S. PATENT DOCUMENTS

| | | | |
|---|---|---|---|
| 3,652,853 A | 3/1972 | Williner et al. | |
| 3,924,127 A | 12/1975 | Cheret et al. | |
| 4,383,330 A * | 5/1983 | DeFelice et al. | 378/187 |
| 4,712,228 A | 12/1987 | Johnson et al. | |
| 4,763,346 A | 8/1988 | Niedospial et al. | |
| 4,783,588 A | 11/1988 | Schmidt et al. | |
| 5,712,486 A * | 1/1998 | Soltani et al. | 250/484.4 |
| 5,861,631 A | 1/1999 | Wendlandt et al. | |
| 5,869,839 A | 2/1999 | Wendlandt et al. | |
| 5,886,359 A | 3/1999 | Bringley et al. | |
| 5,912,944 A | 6/1999 | Budinski et al. | |
| 5,943,390 A | 8/1999 | Wendlandt et al. | |
| 6,042,986 A | 3/2000 | Dickerson et al. | |
| 6,278,126 B1 | 8/2001 | Hoitz | |
| 6,291,831 B1 | 9/2001 | Koren | |
| 6,358,661 B1 | 3/2002 | Dickerson et al. | |
| 6,358,662 B1 | 3/2002 | Dickerson et al. | |
| 6,361,918 B1 | 3/2002 | Dickerson et al. | |

* cited by examiner

*Primary Examiner*—David Porta
*Assistant Examiner*—Djura Malevic

(57) ABSTRACT

Methods and apparatus that facilitate exposure and/or automatic transfer of an image recording medium from an apparatus adapted to handle the image recording medium, such as a cassette, to an image acquisition system, such as an image reader. In one exemplary implementation, a side-access cassette for handling an image recording medium is provided that facilitates the automatic transfer of the image recording medium from the cassette into an automatic loader and from the automatic loader into the cassette. The cassette may further include a radiation conversion window to attenuate radiation during high energy X-ray imaging such that the cassette and automatic loader may be employed in a variety of X-ray imaging processes and techniques. In one aspect, such a conversion window allows recording media such as phosphor plates to be exposed using source radiation incident to the cassette having energy levels on the order of MeV, which is significantly higher than that typically used to expose phosphor plates.

35 Claims, 7 Drawing Sheets

METHODS AND APPARATUS FOR HANDLING IMAGE RECORDING MEDIA

CROSS-REFERENCE TO RELATED APPLICATIONS

This application claims the benefit under 35 U.S.C. §119 (e) of U.S. Provisional Application No. 60/376,712 filed May 7, 2002, entitled "METHODS AND APPARATUS FOR HANDLING IMAGE RECORDING MEDIUMS," by Koren, et al., and U.S. Provisional Application No. 60/383, 748, filed May 28, 2002, entitled "METHODS AND APPARATUS FOR HANDLING IMAGE RECORDING MEDIUMS," by Koren, et al. The aforementioned applications are incorporated herein in their entirety.

FIELD OF THE INVENTION

This invention relates to the field of computer radiography and, more particularly, to the various tasks involving the handling of image recording media during exposure to radiation and transport, and loading of image recording media to and from an image acquisition device.

BACKGROUND

X-rays have been widely utilized in medical diagnostics as an imaging tool (i.e., radiography). In conventional radiography techniques, an image of an object's internal structures are obtained by interposing the object being imaged between a radiation source and an image recording medium. Exemplary image recording media include, but are not limited to, a film that responds to electromagnetic radiation, and a phosphor plate that utilizes concepts of fluoroscopy.

X-ray imaging techniques often include placing an object to be imaged between a high energy electromagnetic radiation source and an image recording medium. As radiation from the radiation source passes through the object, it is absorbed at varying levels by the internal structures of the object. Upon exiting the object, the radiation impinges on the image recording medium with an intensity related to the attenuation of the radiation caused by the different absorption characteristics of the internal structures of the object being imaged. The impinging radiation causes a change in the image recording medium that is proportional to its intensity, thereby storing information about the internal structure of the object. The image recording medium may then be processed to recover the stored information by, for instance, converting it into digital form using various computer radiography (CR) techniques.

X-rays also have been used in radiotherapy (RT) applications as a treatment to fight diseases such as cancer. Radiotherapy often includes both an initial imaging step and a treatment step. The purpose of the initial imaging step, commonly referred to as radiotherapy planning, is to obtain an image of a patient's internal organs without undue exposure to X-ray radiation. Accordingly, such planning images are often obtained at low energy radiation levels, typically on the order of tens to hundreds of kilo-electron-volts (KeV). The planning images then guide the radiation treatment process and facilitate determining various properties of the high energy radiation to be used subsequently during treatment. The planning stage may, for example, ensure that a proper dose of radiation is provided to the patient and applied only in the area of the intended anatomical target.

Radiotherapy treatment also may involve an additional imaging step, referred to as portal imaging, to confirm that the high energy radiation for treatment is properly positioned to expose the intended anatomical target. Portal imaging typically involves first briefly exposing the patient to high energy radiation (typically on the order of mega-electron-volts or MeV) to obtain a faint image of internal organs of the patient to be used as a reference image. The patient is subsequently covered with a radiation shield having a port that permits the passage of radiation through the shield to a small targeted region of the patient. The patient then is exposed again through the port to generate a "portal image," which is subsequently superimposed over the reference image to verify that the port is properly aligned with the radiation source and the intended anatomical target.

From the foregoing examples, it should be appreciated that radiography may include employing radiation having different energy levels for different types of imaging applications, or within various steps of an imaging process (e.g., in the planning and treatment stages of radiographic therapy). However, the response of different types of conventional image recording media generally varies with different energy exposure levels of radiation.

For example, phosphor plates store energy when impinged by radiation. This energy can later be released by scanning the plate with a laser to cause the phosphors in the plate to fluoresce. However, at higher energy levels, such as those used during radiotherapy treatment (e.g., on the order of MeV), the phosphor plate properties are such that high energy photons have a very low probability of interacting with the phosphor plate atomic lattice. Stated differently, the phosphor plate appears increasingly transparent to higher energy radiation and may not be suitable for imaging applications involving high energy radiation levels. Accordingly, phosphor plates generally are more suitable for imaging applications involving low energy radiation levels on the order of KeV (e.g., radiation levels used during radiotherapy planning and other diagnostic imaging tasks).

As a result of the foregoing, in a conventional radiotherapy treatment process involving both planning and portal imaging, a phosphor plate may be used during the planning stage, but not during the portal imaging or treatment stages, due to the higher energy level of radiation used during portal imaging. However, phosphor plates have a generally desirable characteristic in that they may be reused for multiple exposures. Accordingly, some conventional radiotherapy processes may require different types of recording media to be employed at the different imaging stages of the imaging process (e.g., phosphor plates during the planning stage and film during the treatment stage). However, using various media may create problems associated with aligning the images stored on different media and generally complicates the imaging process, making it difficult and time consuming.

Radiotherapy, for example, may be further complicated due to the different handling apparatus that may be required for the various stages. A handling apparatus adapted for one type of image recording media may be unsuitable for another increasing the types of equipment that must be maintained and complicating the image acquisition process. For example, in some radiography applications, an image recording medium may be encased in a protective cassette before and during the imaging process. The term "cassette" refers generally to any of various casings, cartridges or containers adapted to hold other material, and more particularly, material that may benefit from protection and/or material susceptible to damage from direct handling, contact or exposure.

For example, a cassette may be formed as a rigid encasement providing a shell that can withstand the weight of a patient, rough handling, accidental falls, etc. In addition, the cassette typically includes an interface (e.g., a window) that permits radiation to interact with the image recording medium. Once the medium has been exposed to some form of radiation, it is typically removed from the cassette and loaded into an image acquisition system for further processing. For purposes of this disclosure, an image acquisition system refers generally to any apparatus or combination of apparatus that performs processing on the image recording medium after it has been exposed.

A reusable recording medium such as a phosphor plate may be placed into and out of a cassette several times over the life of the medium. For example, in some conventional computer radiography (CR) applications, a phosphor plate in a cassette is exposed to radiation and then the plate is loaded into a CR image reader, which scans the plate to produce a digital image. The phosphor plate is then reloaded into the cassette after image acquisition and may be reused to obtain further images. This process may be repeated several times to accommodate multiple exposures and image acquisitions.

In many cases, one or more of the acts of removing and replacing the image recording medium into the cassette, and loading and unloading the image recording medium into an image acquisition system, are performed manually. That is to say, the acts are carried out at least in part by an operator. However, image recording media, especially reusable media such as phosphor plates, generally are vulnerable to damage during manual handling. In addition, manually removing and replacing image recording media to and from the cassettes and manually loading and unloading the media into and out of the image acquisition system is often inconvenient and time-consuming. In particular, much care must be taken not to scratch or otherwise damage the medium during the process and to ensure that the medium has been properly loaded into the image acquisition device and cassette, respectively.

In view of the foregoing, it may be appreciated that some image recording media, and in particular phosphor plates, generally are useful for imaging applications over particular energy ranges of radiation exposure, and may be used for multiple exposures and subsequent image acquisition. Additionally, some image recording media, such as phosphor plates for example, are generally susceptible to some degree of damage during handling, especially over multiple uses where possible.

SUMMARY

The present invention is directed generally to various methods and apparatus that facilitate exposure of an image recording medium and/or automatic transfer of an image recording medium from an apparatus adapted to handle the image recording medium such as a cassette, to an image acquisition system, such as an image reader.

For example, one embodiment of the invention is directed to an apparatus to handle at least one image recording medium. The apparatus comprises a substantially flat housing including two essentially parallel sides having similar dimensions. The housing further includes a plurality of relatively smaller-dimensioned edges, wherein at least one edge of the housing includes an opening configured to allow passage of the image recording medium into and out of the housing.

In one aspect of the foregoing embodiment, the apparatus does not include any doors. In another aspect, the apparatus is configured as an essentially flat enclosure or "cassette" having narrow sides, and the opening is configured as a slit along one of the narrow sides of the cassette, such that the cassette is a "side-access" enclosure rather than a "top-loaded" enclosure. In yet another aspect, the apparatus includes at least one ramp to facilitate positioning of the image recording medium in the apparatus when the apparatus is handling the image recording medium.

Another embodiment of the invention is directed to an apparatus for handling at least one image recording medium, wherein the apparatus includes a radiation conversion element to attenuate radiation passing through the apparatus so as to reduce radiation exposure of the image recording medium. In one aspect of this embodiment, such a conversion element allows a recording medium such as a phosphor plate to be exposed using source radiation incident to the apparatus having energy levels on the order of MeV, which is significantly higher than that typically used to expose phosphor plates.

Another embodiment of the invention is directed to a method comprising an act of automatically transferring at least one image recording medium between an image acquisition system and an apparatus to hold the at least one image recording medium.

Another embodiment of the invention is directed to a method, comprising acts of attenuating radiation incident to at least one image recording medium, exposing the at least one image recording medium to the attenuated radiation, and automatically transferring the at least one image recording medium from an apparatus holding the at least one image recording medium to an image acquisition system.

Another embodiment of the invention is directed to a method for handling at least one image recording medium, comprising an act of automatically transferring the at least one image recording medium into or out of a substantially flat housing including two essentially parallel sides having similar dimensions, the housing further including a plurality of relatively smaller-dimensioned edges, at least one edge of the housing including an opening through which the at least one image recording medium is passed.

Another embodiment of the invention is directed to a radiotherapy method, comprising acts of positioning a patient between at least one phosphor plate recording medium and a source of high energy radiation, exposing the patient to the high energy radiation, and exposing the phosphor plate recording medium to attenuated radiation during the act of exposing the patient to the high energy radiation.

Another embodiment of the invention is directed to an apparatus to handle at least one image recording medium. The apparatus comprises at least one radiation attenuator configured to attenuate first radiation incident to the apparatus such that at least some of the first radiation, when present, is attenuated to provide second radiation, wherein the second radiation has a lower energy than the first radiation. The apparatus further comprises at least one element adapted to facilitate automatic transfer of the at least one image recording medium into and out of the apparatus. The at least one element further is adapted to facilitate placement of the at least one image recording medium, when handled by the apparatus, in a position of alignment with the at least one radiation attenuator such that at least some of the second radiation impinges on the at least one image recording medium.

Another embodiment of the invention is directed to an apparatus to handle at least one image recording medium, comprising a radiation window, and at least one element adapted to facilitate automatic transfer of the at least one image recording medium into and out of the apparatus. The at least one element further is adapted to facilitate placement of the at least one image recording medium, when handled by the apparatus, in a position of contact alignment with the radiation window such that radiation incident to the apparatus, when present, passes through the radiation window and impinges on the at least one image recording medium. The at least one element further is adapted to reduce a rubbing between the radiation window and the at least one image recording medium during the placement of the at least one image recording medium until the position of contact alignment is achieved.

Another embodiment of the invention is directed to an apparatus to handle at least one image recording medium, comprising a radiation window having an essentially flat surface, and at least one element adapted to facilitate transfer of the at least one image recording medium in to and out of the apparatus. The at least one element further is adapted to facilitate placement of the at least one image recording medium, when handled by the apparatus, in a position of alignment with the radiation window such that radiation incident to the apparatus, when present, passes through the radiation window and impinges on the at least one image recording medium. The at least one element further is adapted to facilitate a movement of the at least one image recording medium simultaneously in a first direction parallel to the essentially flat surface and a second direction perpendicular to the essentially flat surface during the placement of the at least one image recording medium.

Another embodiment of the invention is directed to a method of handling at least one image storage medium, comprising an act of placing the at least one image storage medium into and out of a position of alignment with a radiation window having an essentially flat surface by moving the at least one image storage medium simultaneously in a first direction parallel to the essentially flat surface and a second direction perpendicular to the essentially flat surface.

Another embodiment of the invention is directed to an apparatus to handle at least one image recording medium, comprising a radiation window having an essentially flat surface, and at least one element adapted to facilitate transfer of the at least one image recording medium into and out of the apparatus. The at least one element further is adapted to facilitate placement of the at least one image recording medium, when handled by the apparatus, in a position of alignment with the radiation window such that radiation incident to the apparatus, when present, passes through the radiation window and impinges on the at least one image recording medium. The at least one element further is adapted to facilitate a movement of the at least one image recording medium consecutively in a first direction parallel to the essentially flat surface and a second direction perpendicular to the essentially flat surface during the placement of the at least one image recording medium.

Another embodiment of the invention is directed to a method of handling at least one image storage medium, comprising an act of placing the at least one image storage medium into and out of a position of alignment with a radiation window having an essentially flat surface by moving the at least one image storage medium consecutively in a first direction parallel to the essentially flat surface and a second direction perpendicular to the essentially flat surface.

Another embodiment of the invention is directed to an apparatus for handling and automatic transfer of an image recording medium to an image acquisition system. The apparatus comprises at least one first moveable element adapted to support the at least one image recording medium, wherein the at least one first moveable element adapted for movement in along a first axis. The apparatus also comprises at least one second moveable element adapted for movement along at least a second axis essentially perpendicular to the first axis, wherein the apparatus is adapted such that a movement of the at least one second moveable element along the second axis causes movement of the at least one first moveable element along the first axis.

Another embodiment of the invention is directed to an automatic loader comprising a motor, at least one positioning member coupled to the motor, wherein the at least one positioning member is adapted to facilitate movement of an image recording medium into and out of a cassette, and at least one path guide to control a position of the at least one positioning member.

Another embodiment of the invention is directed to an image acquisition system adapted to mechanically engage with a cassette that holds at least one image recording medium. The cassette includes at least one element to facilitate a transfer of the at least one image recording medium between the image acquisition system and the cassette. The cassette also includes a slit through which the at least one image recording medium is transferred.

The image acquisition system of the foregoing embodiment comprises a loading tray to hold the cassette, a locking mechanism to lock the cassette to the image acquisition system while the cassette is placed on the loading tray, and a sensor to indicate when the cassette is locked to the image acquisition system. The system also comprises a tongue disposed adjacent to the slit of the cassette when the cassette is locked to the image acquisition system, and a moveable positioning member mechanically coupled to the tongue and disposed in the loading tray, wherein the movable positioning member is adapted for engagement with the at least one element of the cassette. The system also comprises a motor mechanically coupled to the tongue and the positioning member, wherein the motor is responsive to a signal output by the sensor to move the tongue and the positioning member when the cassette is locked to the image acquisition system, so as to transfer the at least one image recording medium through the slit of the cassette. The system also comprises a pair of rotating rollers to pull the at least one image recording medium into the image acquisition system and to push the at least one image recording medium out of the image acquisition system, a drum to support the at least one image recording medium, wherein the drum including at least two rails, and a spring-loaded cart movable along the at least two rails of the drum to receive the at least one image recording medium and to hold the at least one recording medium in position on the drum between the spring-loaded cart and the pair of rotating rollers.

It should be appreciated the all combinations of the foregoing concepts and additional concepts discussed in greater detail below are contemplated as being part of the inventive subject matter disclosed herein. In particular, all combinations of claimed subject matter appearing at the end of this disclosure are contemplated as being part of the inventive subject matter.

DETAILED DESCRIPTION

Figure 1A:
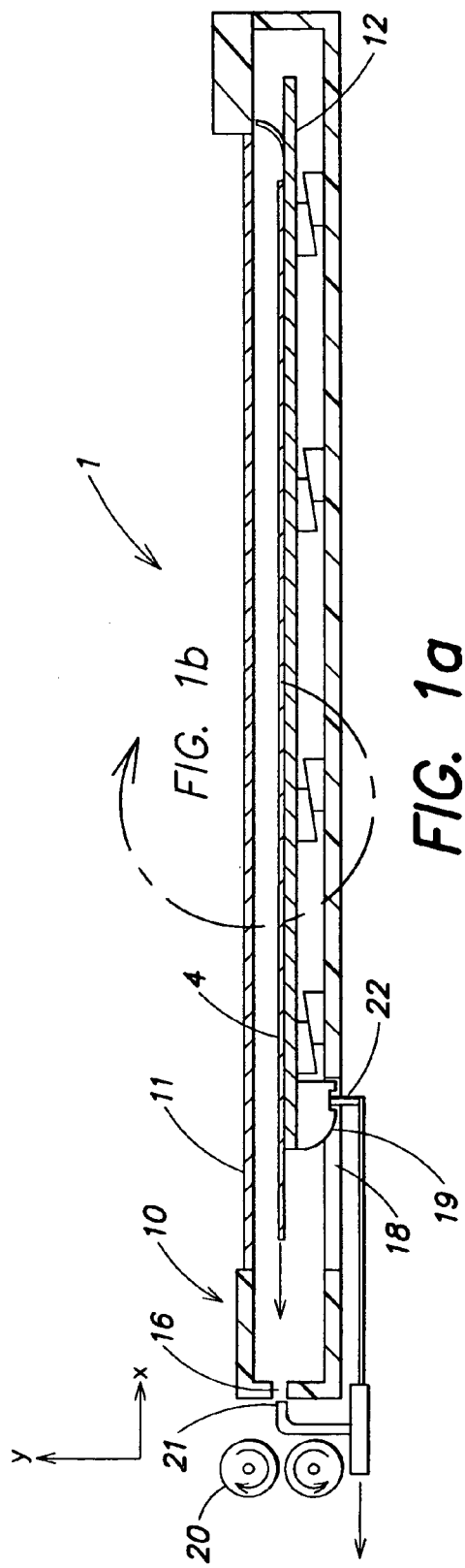
FIGS. 1A and 1B are diagrams illustrating two views of a cassette for holding an image recording medium, according to one embodiment of the invention.

As discussed above, radiography typically involves exposing an image recording medium to radiation that has been passed through and partially absorbed by an object being imaged. The different absorption characteristics of the various internal structures of the object being imaged block varying amounts of radiation energy from reaching the image recording medium, thereby casting "shadows" of different intensity on the image recording medium. The image recording medium can then be later processed to recover an image of the internal structure of the imaged object. For example, a phosphor plate may be scanned by an image reader, or film may be developed in a darkroom.

The image recording medium is often encased in a protective handling apparatus, such as a cassette, to prevent damage by trauma, such as the weight of a patient or accidental drops, or exposure to light. Typically, after exposure to radiation the image recording medium undergoes further processing by an image acquisition system, such as an image reader, in order to produce an image that can be viewed by an operator or diagnostician. In addition, the information stored on the image recording medium may be changed to a different format, such as a digital format, that facilitates further processing and/or storage of the image.

However, during the transfer of the image recording medium from its protective handling apparatus to an image acquisition system, the image recording medium is often vulnerable to damage that may cause degradation or loss of the information stored on the medium, or that may render the image recording medium unusable for subsequent exposures. The image recording medium is particularly vulnerable when the transfer between the handling apparatus and the image acquisition system is performed manually. In addition, manual loading and unloading of the image acquisition system is prone to operator error.

In view of the foregoing, one embodiment of the present invention is directed to methods and apparatus for automatically transferring an image recording medium from an apparatus adapted to handle the image recording medium, such as a cassette, to an image acquisition system, such as an image reader.

The term automatic, as used herein, refers to actions that require little or no user or operator involvement. For example, an automatic loading (auto-loading) image reader and/or cassette refers to an image reader and/or cassette having various features that permit extraction of an image recording medium (e.g., a phosphor plate) from the cassette, loading of the image recording medium into the reader, and replacement of the image recording medium back into the cassette without user involvement.

It should be appreciated that certain fundamental actions such as physical transport of the cassette to the image reader and loading the cassette into the image reader (or otherwise attaching the cassette to the image reader), for example, may require an operator of some minimum user involvement. However, the actions of loading and unloading the image recording medium into and out of the cassette are automatic. In view of the foregoing, the term "automatic" or "automatically" is used herein in connection with actions corresponding to transferring an image recording medium between an image recording medium handling apparatus (e.g., a cassette) and an image acquisition system (e.g., a CR image reader) that are carried out, for example, by methods and apparatus according to the invention that do not require user involvement beyond the fundamental actions described above.

Various concepts incorporating aspects of the present invention include methods and apparatus for automatically transferring an image recording medium to and from a handling apparatus wherein the image recording medium is automatically taken from and returned to a set position within the apparatus such that the image recording medium is properly positioned and is ready for recording without further and/or manual adjustment of the image recording medium. For example, according to one embodiment, an image recording medium may be taken from and returned to a handling apparatus without direct handling of the image recording medium by an operator. In one aspect of this embodiment, this is accomplished via a "side-access" cassette, in which an image recording medium is placed into, and taken from, a cassette via a slit or opening along a narrow side of an essentially flat cassette structure. The term "set position" refers generally to a configuration and arrangement of a handling apparatus such that, when an image recording medium is contained within, the image recording medium is in a position that facilitates its exposure to radiation when employed, for example, in any of various X-ray imaging applications.

Further concepts according to the present invention include methods and apparatus for protecting an image recording medium during an automatic transfer between an image recording medium handling apparatus and an image acquisition system. Also included are concepts directed to methods and apparatus for providing an image recording medium handling apparatus adapted to facilitate automatic transfer of the recording medium and also provide a radiation conversion interface (e.g., a radiation attenuator) between radiation emitted from a radiation source and the image recording medium.

In particular, as discussed above, for some conventional radiography applications involving different radiation energy exposure levels (e.g., radiotherapy planning, portal imaging and treatment), different image recording media typically may be required. More specifically, a phosphor plate recording medium generally is not suitable for image recording using high energy radiation exposure level, typical of the treatment and portal imaging process in radiotherapy. However, a phosphor plate generally is suitable for lower energy exposures, and a particularly desirable recording medium for some applications as it may be reused for multiple exposures.

To address the foregoing inconvenience, Applicants have appreciated that a cassette to handle a recording medium, such as a phosphor plate for example, may include a radiation conversion interface to attenuate the higher energy radiation to a lower energy radiation within the range where the phosphor plate is receptive. This conversion interface may be any suitable material having a higher probability of interaction with the high energy radiation. For example, the interface may be a metal sheet, such as copper. When photons of the high energy radiation are absorbed by the metal atoms, the energy is released from the metal sheet as electrons that impinge into the lattice of the underlying phosphor plate. Hence, a high energy photon is converted into a large number of lower energy electrons within the range in which the phosphor plate is receptive.

This technique allows radiotherapy planning, portal imaging and treatment to be completed using the same image recording medium by providing a conversion interface between the emitted radiation and the image recording medium during high energy exposure. Consequently, the same imaging equipment may used during all phases of the radiotherapy process. Furthermore, Applicants have recognized and appreciated that by automating the process of transferring the phosphor plate to and from the cassette, potential damage to the phosphor plate is reduced, thereby prolonging the useful life of the plate for radiotherapy and other radiography applications.

Following below are more detailed descriptions of various concepts related to, and embodiments of, methods and apparatus according to the present invention. It should be appreciated that various aspects of the invention, as discussed above and outlined further below, may be implemented in any of numerous ways, as the invention in not limited to any particular manner of implementation. Examples of specific implementation are provided for illustrative purposes only.

Figure 1B:
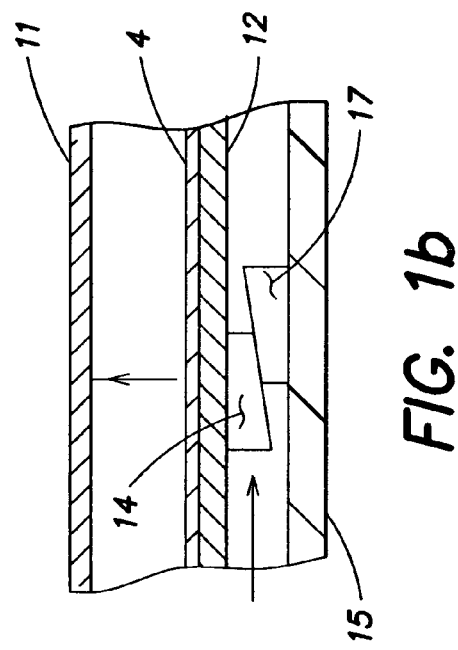
Figure 2:
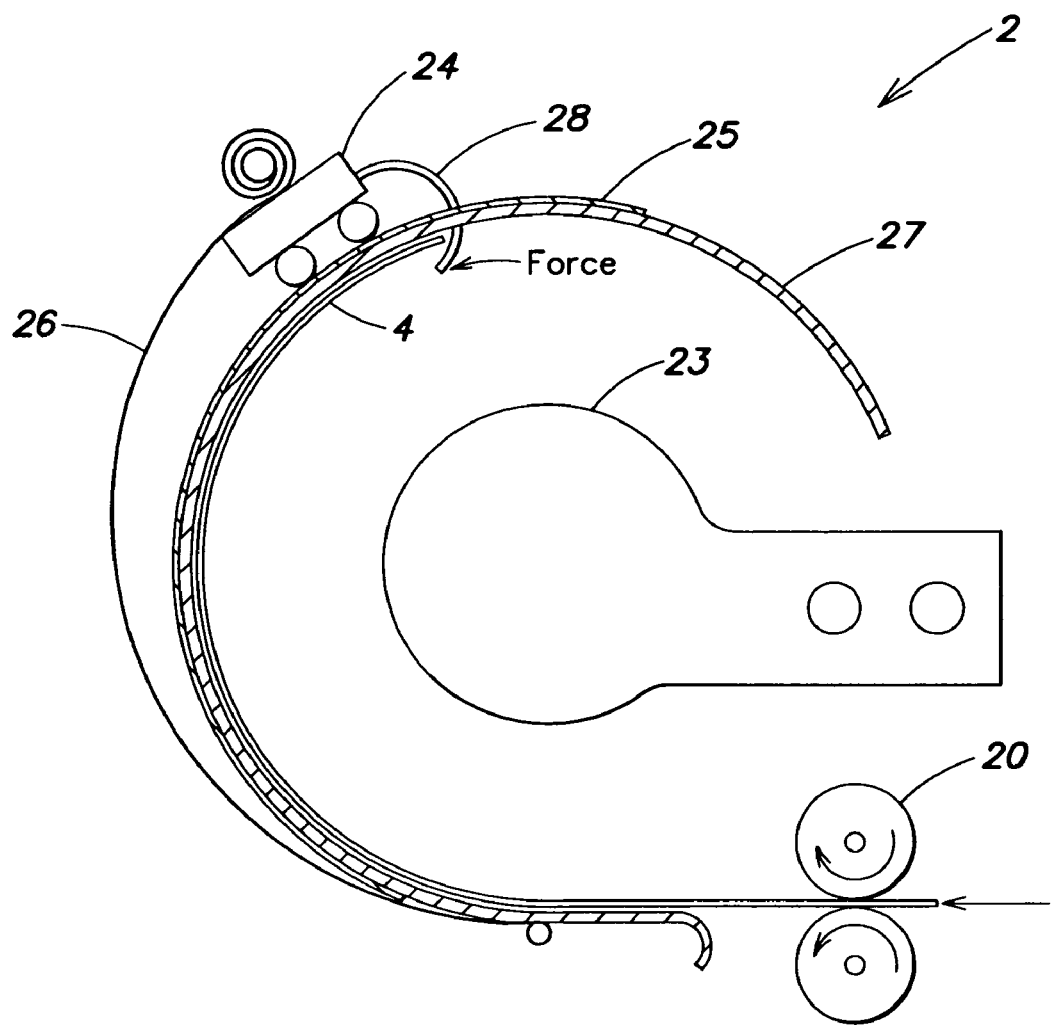
FIG. 2 is a diagram illustrating some components of an image reader, according to one embodiment of the invention.

FIGS. 1a, 1b, and 2 illustrate one embodiment including a cassette and an image reader having automatic loading capabilities incorporating various aspects of the present invention. FIGS. 1a and 1b illustrate a cross section of a cassette 1 adapted to hold an image recording medium, or "plate," as viewed from the side. While FIGS. 1a and 1b are not drawn to scale, it should be appreciated that cassette 1 may be a standard size imaging cassette and that concepts according to the present invention may be implemented in cassettes that comply with current international standards. However, it should be further appreciated that aspects of the invention can be applied to handling apparatus of different sizes and shapes, as the invention is not limited to the cassette illustrated in FIGS. 1a and 1b, nor by any particular standard.

Cassette 1 is constructed having an external frame illustrated in FIG. 1a as cassette box 10. In this embodiment, the cassette is rectangular in shape having two essentially flat sides, and four narrow edges. In the view of one of the narrow edges in FIG. 1a, the edge has been cut-away to illustrate some of the internal structures of the cassette. The cassette box may be constructed to withstand the weight of a patient, and the frame of the box may be designed such that it tolerates rough handling and/or accidental falls while preventing damage to the image recording medium and the internal structures and components of the cassette. The cassette box may be made of a plastic material, and generally may be constructed of any material suitable for providing a protective casing. A front edge of the cassette includes a narrow slit, shown in FIG. 1a as opening 16, that allows extraction and insertion of the image recording plate into the cassette.

In this manner, the cassette functions essentially as a "side-access" cassette, rather than a "top-loaded" cassette (e.g., using a hinged panel or door for one of the flat larger sides of the cassette). Providing a "side-access" cassette (i.e., an opening through which an image recording medium may be extracted and inserted on a narrow edge) rather than a "top-loaded" cassette facilitates an automatic transfer of the image recording medium from the cassette and aids in protecting the image recording medium during a transfer, for example, by preventing the cassette from rubbing against the inner surface of one of the flat sides or against other components and/or internal structures in the cassette.

In the embodiment of FIGS. 1a and 1b, a top side of the cassette comprises a window 11. The window typically faces the radiation source during exposure and permits interaction between emitted radiation and the contents of the cassette. For example, the cassette 1 may be adapted to encase a plate image recording medium 4. Plate 4 may be a phosphor plate, film, etc. The window may be constructed of a material that permits radiation to pass through relatively unchanged (i.e., the window may be transparent to the radiation) and interact directly with the plate 4. The window may also be constructed of a material that provides a conversion interface between the radiation and the plate.

For example, according to one embodiment, the window may include a radiation conversion element that interacts with the radiation and provides a converted energy to plate 4. In particular, window 11 may be a metal sheet that absorbs portions of an emitted photonic energy and releases the energy as electrons at a lower energy state. The lower energy electrons released from the conversion element then impinge on the surface of plate 4. According to one aspect of such an embodiment, the imaging process significantly benefits from the plate 4 being in contact with the radiation conversion element so as to adequately receive the lower energy electrons.

As also shown in FIGS. 1a and 1b, according to one embodiment an essentially flat tray 12 is constructed to hold plate 4. The tray 12 has a flat top surface having similar dimensions as plate 4. In one aspect of this embodiment, the tray 12 is designed to have one dimension which is of lesser length than the plate. In another aspect of this embodiment, the tray is shorter in length than the plate in the x-direction indicated in FIG. 1a (i.e., the direction of travel of the plate into and out of the cassette). Thus, in such an embodiment, when a plate is placed in tray 12, it has a portion that extends beyond the tray at the front edge of the cassette containing the opening 16.

According to one embodiment, the tray 12 is also supported underneath by one or more ramps 14 coupled to the bottom of the tray 12, and/or one or more ramps 17 on the interior side of the bottom of the cassette box 10. In one aspect of this embodiment, the ramps 14 and 17 form one or more ramp pairs that allow the position of the tray to be varied in both the x-direction and the y-direction (the x-axis and y-axis depicted in FIGS. 1a and 1b illustrate directions parallel to the plane of tray 12 and perpendicular to the plane of tray 12, respectively). Although ramp pairs comprising ramps 14 and 17 are shown in FIGS. 1a and 1b, it should be appreciated that the invention is not limited in this respect, as other implementations are possible to support and/or facilitate a particular movement of the tray 12 (e.g., one or more ramps coupled to either the tray or the cassette, other support and/or displacement mechanisms/structures as discussed further below, etc.).

Figure 3:
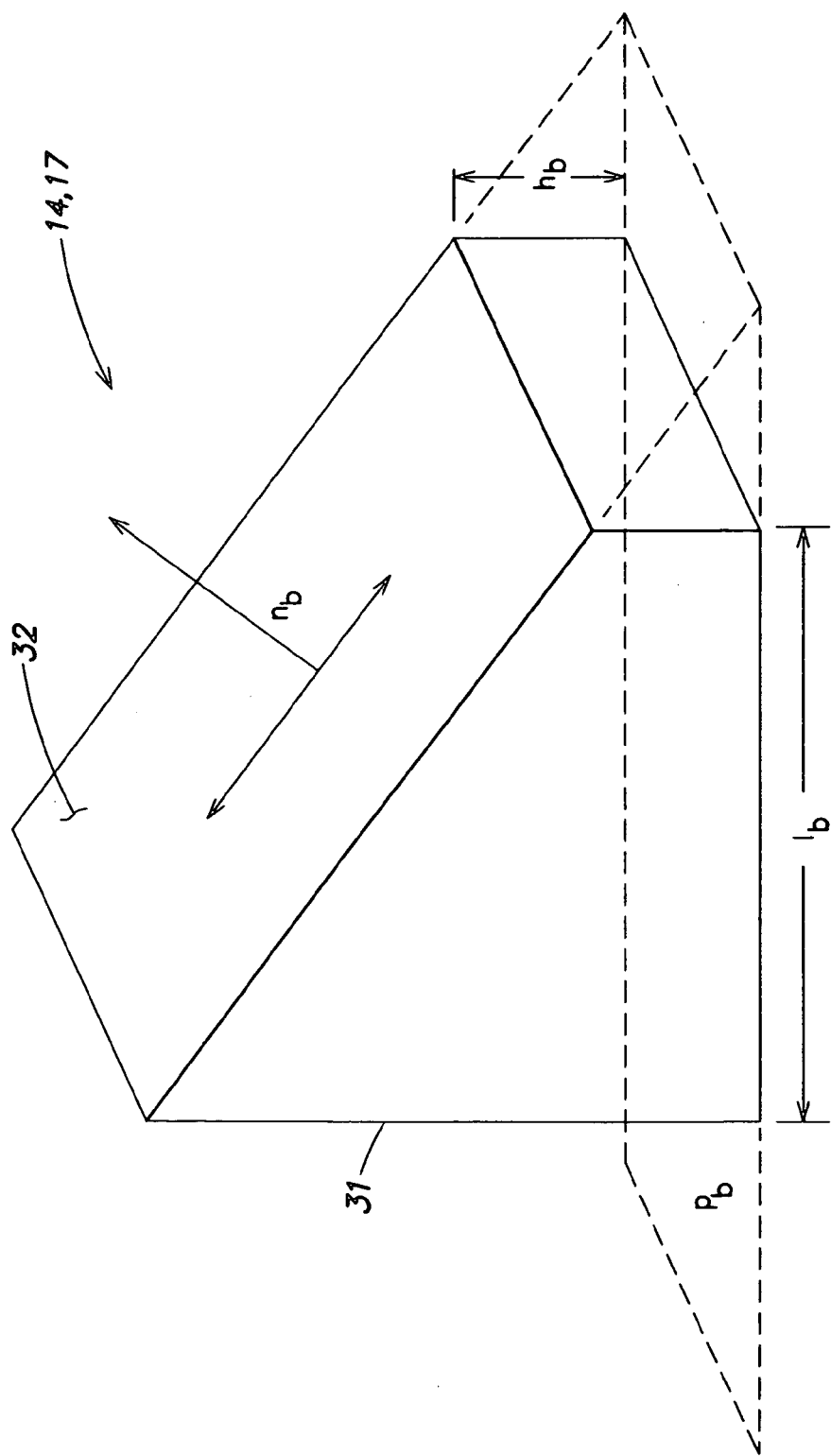
FIG. 3 is a diagram illustrating an example of a ramp employed in the cassette of FIGS. 1A and 1B, according to one embodiment of the invention.

FIG. 3 illustrates an exemplary ramp 14 according to one embodiment of the present invention. The one or more ramps 17 shown in FIGS. 1a and 1b may be constructed similarly to the exemplary ramp 14 shown in FIG. 3. In the embodiment of FIG. 3, ramp 14 comprises a base 31 having an inclined plane surface 32. The inclined plane surface may be truncated before reaching the plane $P_b$ of the base, forming a base height $h_b$. The base height $h_b$ depends upon the extent of the truncation. The dimensions of the ramp, the base height $h_b$, and the slope of the inclined plane as defined by the inclined plane surface normal $n_b$ are not specifically limited in the present invention and may be chosen to satisfy various design and performance requirements, as discussed in further detail below.

Referring again to FIGS. 1a and 1b, according to one embodiment each ramp pair may include a first ramp (e.g., the ramp 14) having an inclined plane surface facing away from the window 11, and a second ramp (e.g, the ramp 17) having an inclined plane surface facing towards the window 11. For example, in one aspect of this embodiment, the first ramp 14 may have its base affixed to the bottom surface of the tray and the second ramp 17 may have its base affixed to a bottom side wall 15 (e.g., the interior surface of a bottom side of the cassette) as illustrated in FIG. 1b. In another aspect of this embodiment, the ramp 14 may be formed of the same material as the tray 12, and the ramp 17 similarly may be formed of the same material as the cassette box 10; however, it should be appreciated that the invention is not limited in this respect, as other materials may be used for either of the ramps 14 and 17. In particular, according to another aspect, either of the ramps 14 and 17 may be formed as an integral part of the tray and cassette box, respectively, or may be attached or otherwise coupled to the tray and cassette box, respectively, as discreet components, as discussed further below.

In one embodiment, the ramps in a ramp pair are constructed with equal inclined plane surface normals and are disposed such that their respective normals point in opposite directions when the inclined plane surfaces are in contact. According to one aspect of this embodiment, this ramp pair structure provides a mechanism that allows the tray to be moved simultaneously parallel and perpendicular to the plane of the tray. In particular, as illustrated in FIGS. 1a and 1b, when a force having a component in the x-direction is applied to the tray, the first ramp is displaced in a direction along the contact between the ramp pair (i.e., in a direction orthogonal to the normals of the inclined plane surfaces). As such, a translation of the tray 12 is affected in both the x-direction and the y-direction.

It should be appreciated that the amount of translation in the x-direction and y-direction can be adjusted by choosing appropriate ramp dimensions. In addition, the aspect ratio between x-axis translation and y-axis translation affected by a given force can be adapted by choosing appropriate dimensions and characteristics of the ramps (e.g., $h_b$, $l_b$, $n_b$, etc). For example, in one embodiment, the inclined plane surface normal is chosen such that the inclined plane is less than 45° with respect to the plane of the base. In another embodiment, the inclined plane surface normal is chosen such that the inclined plane is at approximately 15° with respect to the plane of the base.

In the embodiment illustrated in FIG. 1a, a set position of the image recording medium corresponds to its position when the plate tray 12 has been moved to its extreme in the positive x-direction. Because of the orientation of the ramp pairs, this position also corresponds to an extreme in the positive y-direction. In the set position, the image recording medium is in contact with the backside of window 11. As set forth above, such a contact is generally desirable in embodiments where window 11 is a radiation conversion element, for example, a metal plate. When high energy radiation impinges on the radiation conversion element, the radiation conversion element tends to release the lower energy electrons in all directions. Direct contact between the image recording medium and the radiation conversion device may mitigate the spread of electrons that can cause blurring in the associated image.

It should be appreciated that the set position of the image recording medium need not result in a contact between the image recording medium and a radiation window. For example, when the radiation window is generally transparent to impinging radiation (i.e., the window does not convert the radiation or substantially attenuate the radiation) the absence of contact between the image recording medium and the window may not have the same or any deleterious effects on the resulting image. However, the set position generally indicates that the image recording medium is in a position wherein it is considered ready for exposure to radiation.

As shown in FIG. 1a, according to one embodiment, the cassette 1 further may include a slot 18 on the bottom side of the cassette and a mechanical interface 19 (e.g., a recess) on the bottom side of tray 12. The mechanical interface 19 allows a positioning member (e.g., as described in connection with FIGS. 2 and 6) to engage the tray 12 and apply a force to the tray to affect a translation of the tray. According to various embodiments, a protruding arm may be used as the mechanical interface 19, or any other mechanism or formation suitable for engaging a positioning member. The slot 18 allows an engaged positioning member to move along the x-axis. When an engaged positioning member is moved along the slot 18, this x-axis translation exerts a force on the tray affecting motion at the ramp pair contact surface, causing the tray to move in the x-direction and the y-direction. The mechanical interface and positioning member may be designed in any number of ways that permits an engaging wherein a translation of the positioning member applies a force on the mechanical interface to cause a corresponding translation.

FIG. 1a also illustrates an embodiment of portions of an image reader loader that facilitates automatic transfer of an image recording medium between cassette 1 and an image acquisition system. The image reader loader may be part of an image acquisition system such as the one described in U.S. Pat. No. 6,291,831, which is incorporated herein in its entirety. The loader includes rollers 20, tongue 21, and pin 22, which acts as a positioning member. The rollers 20 include a pair of cylinders that rotate in opposite directions to grip a protruding portion of an image recording medium and extract the medium from the cassette. In one embodiment, the tongue 21 and pin 22 are mechanically attached to one another and coupled to a motor (not shown), for example a stepper motor, that can move the tongue and pin along the x-axis and also raise and lower the tongue and pin along the y-axis.

In the embodiment of FIG. 1a, the tongue and pin are coupled to one another and the motor such that when the tongue and pin are moving towards the image reader (i.e., in the negative x-direction), the tongue experiences a steady translation in the negative y-direction and the pin experiences a steady translation in the positive y-direction (i.e., the tongue is lowered while the pin is raised). When the tongue and pin are moving away from the reader (i.e., in the positive x direction), the tongue experiences a steady translation in the positive y-direction and the pin experiences a steady translation in the negative y-direction (i.e., the tongue is raised while the pin is lowered).

An automatic transfer procedure according to one embodiment of the present invention begins by inserting the cassette 1 into a cassette insertion opening (not shown) of the loader. In the embodiment illustrated in FIGS. 1a and 1b, the cassette is placed into the loader by inserting the front edge containing the opening 16 into the cassette insertion opening with the top side facing upwards. The loader may include a sensor (not shown) that detects when a cassette has been properly inserted into the loader. The sensor then activates the loader to begin extracting the plate 4 from the cassette 1. For clarity, the position of the tray at its two extremes is referred to herein as its set position and its loading position. In a set position, the tray is at its maximum position in the x and y direction. In the set position, the plate is pressed up against the window and is ready for exposure. In a loading position, the tray is at its minimum position in the x and y direction. In this embodiment, in the loading position, the portion of the plate extending beyond the tray is positioned through the opening and is external to the cassette.

When the loader is activated, the motor begins to draw the tongue and pin toward the reader (i.e., in the negative x-direction). As the tongue and pin are pulled towards the reader, the tongue is being lowered and the pin is being raised. At a certain point, the pin has been raised a sufficient amount to engage the mechanical interface 19 at the bottom of the tray through the slot 18 on the bottom side of the cassette. Accordingly, the motor, via the engaged pin, exerts a force on the tray causing the ramps affixed to the tray to displace along the contact surface between the ramp pairs. Consequently, the tray is translated in the negative y-direction such that the contact between the plate 4 and the window 11 is disengaged at the same instant that the tray is moved in the negative x-direction towards the opening 16. Accordingly, disengaging contact between the image recording medium and window 11 involves little or no rubbing between the two surfaces that may otherwise damage the image recording medium.

The tray continues to be forced from the set position towards the loading position. The advancing tray forces the portion of the plate that extends beyond the tray through opening 16. During the advance of the tray, the tongue is steadily lowered such that it passes under the plate as the leading edge of the plate comes into contact with the rollers 20. The rollers 20 grip the leading edge of the plate, extract it from the tray, and load it into the internal portion of the reader to be scanned.

FIG. 2 illustrates portions of an image reader 2 adapted for automatic loading of an image recording medium. Not all of the components of image reader 2 are shown in FIG. 2. For example, tongue 21 and pin 22 of the image reader loader as illustrated in FIG. 1a are not shown in FIG. 2. Image reader 2 comprises an optical bench 23 and drum 27. The optical bench contains the necessary components to scan an image recording medium applied to the inside of the drum 27 as discussed in previously incorporated U.S. Pat. No. 6,291,831. In order for an image recording medium to be properly loaded into image reader 2, the image recording medium needs to be applied such that it conforms to the inside of cylindrical drum 27. However, further details with respect to the operation and procedure of scanning an image recording medium are not germane to the present disclosure and are not discussed further herein.

According to one embodiment, image reader 2 may include a cart 24 that is moveable along rails 25 that are disposed around the outside circumference of cylindrical drum 27. The cart includes a protruding member 28 adapted to make contact with the leading edge of image recording medium (e.g., plate 4) on the inside surface of the drum. A constant force spring 26 is coupled to the cart such that the protruding member 28 can provide a constant force on the leading edge of a plate being loaded into the image reader independent of where along the circumference of the drum the cart is positioned.

In the embodiment of FIG. 2, as the rollers 20 pull the leading edge of the plate into the internal portion of the drum, the cart 24 is positioned near the rollers. The leading edge of the plate is forced up against the protruding member 28 which applies a force, via the constant force spring, in a direction opposite that applied by the rollers 20. The opposing forces cause the plate to bend such that it conforms to the shape of the cylindrical drum 27. The cart 24 moves along rails 25 such that the protruding member remains in contact with the leading edge of the plate as the plate is advanced around the inside of the drum 27 by rollers 20. At some point, the rollers will have completely extracted the plate from the cassette and the trailing edge of the plate will pass through the rollers. At this moment, the rollers may stop rotating and the trailing edge of the plate rests against the rollers, prohibiting the plate from exiting the drum. The plate has now been loaded into the image reader and is in position for scanning by components of the optical bench.

When the image reader has finished scanning the plate, the operation of extracting the plate may be reversed by, for example, causing rollers 20 to rotate in the opposite direction such that they grip the trailing edge of the plate and begin to pull the plate towards the cassette. As the rollers 20 continue to advance the plate towards the cassette, the trailing edge of the plate is inserted back into the tray 12. When the leading edge of the plate has passed through the rollers, the plate has been inserted into the tray and is returned to the loading position. At the same time, the motor causes the tongue and pin to move in a positive x-direction. The pin is still engaged with the recess of the tray and begins to force the tray towards the set position. The force exerted by the motor, via the engaged pin, forces a displacement of the ramp pair along the contact surface, affecting a positive x and a positive y translation of the tray.

As the tray is moved towards the set position, the pin is being lowered and the tongue raised. At some point, the plate clears the tongue and the tongue rises to the level of the plate and begins to push on the leading edge of the plate. Eventually, the pin is lowered sufficiently enough to disengage from the tray as the tongue pushes the plate into the set position. Thus, the plate has been fully inserted into the cassette and the loader is deactivated. The cassette can now be removed from the loader and used in a subsequent exposure.

It should be appreciated that when the tray is first moved from set position, the tray immediately experiences a translation in the negative y-direction that removes the contact between the plate and the window. Accordingly, during the time that the tray is being moved from set position to loading position, there is no contact between the plate and the window. Similarly, during the time that the tray is being moved from loading position to set position, there in no contact between the plate and the window until the final instant when the tray and the plate are returned to the set position. Consequently, the plate is protected from rubbing or scraping against the window that might scratch or otherwise damage the plate during extraction and insertion of the plate into and out of the cassette.

Figure 4:
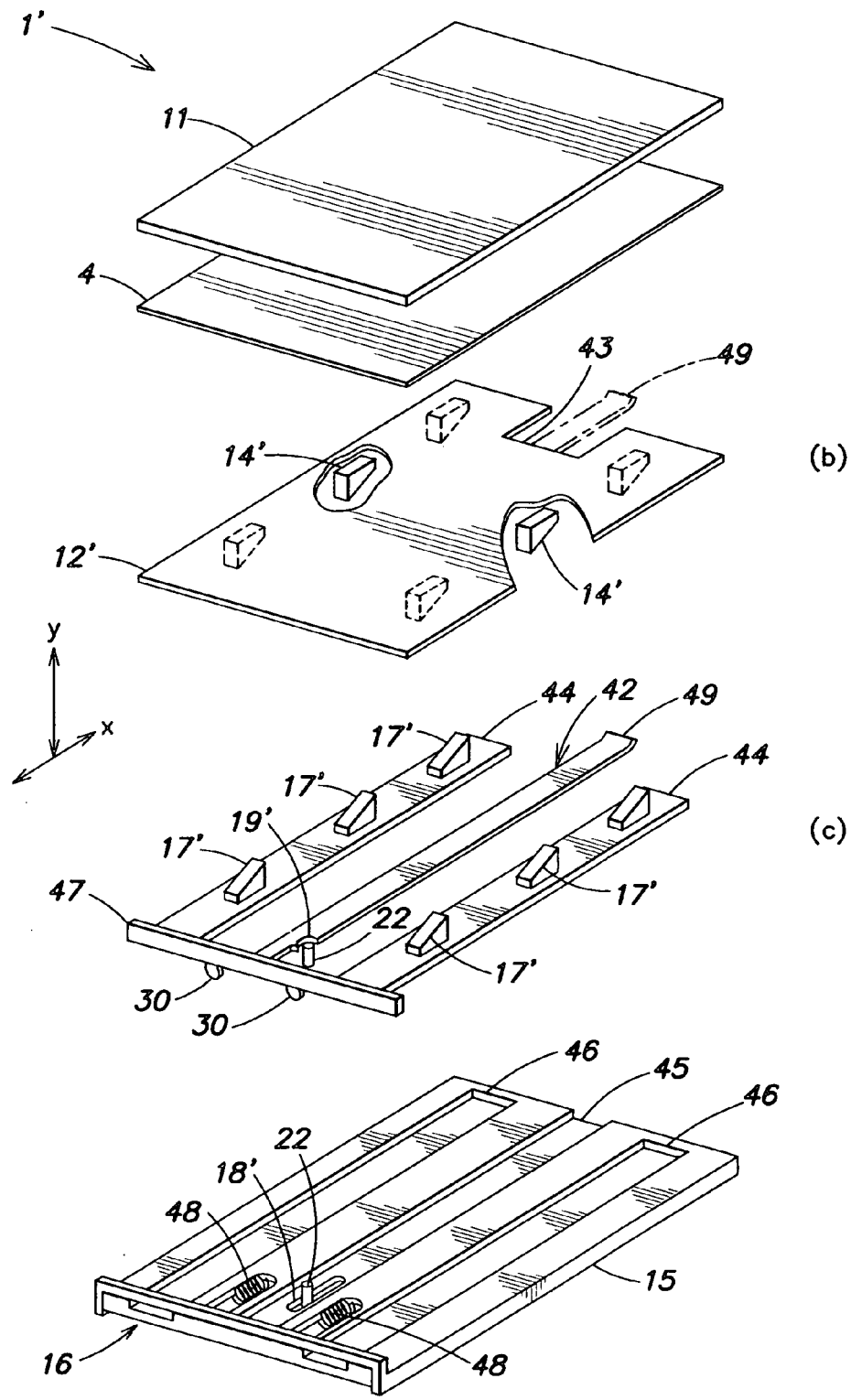
FIG. 4 illustrates an exploded view of a cassette, according to another embodiment of the invention.

FIG. 4 illustrates another embodiment of a cassette 1' according to the present invention. The cassette includes features that facilitate automatic loading and unloading of an image recording medium into an image reader and further prevent damage to the medium that may occur during loading and unloading. In addition, cassette 1' illustrated in FIG. 4 includes features that separate the x and y components of the movement of the plate 4 from a set position to a loading position such that the component movements can be controlled independently.

Cassette 1' includes a window 11 as described in connection with the embodiment illustrated in FIGS. 1a and 1b. An essentially flat tray 12' is constructed to support an image recording medium, such as plate 4, and has an essentially flat surface having a top and a bottom side. Tray 12' includes a recess 43 along one of its edges. A plurality of ramps 14' are affixed to the bottom side of the tray.

Cassette 1' further includes a plurality of ramp strips 44. Each ramp strip may be positioned within a strip channel 46 that allows the ramp strip to move in the x-direction (i.e., in a direction parallel to the plane of the tray 12') independently of the tray 12'. That is, the ramp strips can be translated in the x-direction without incurring a corresponding translation of tray 12'. Ramp strips 44 may include a flat surface having a top and a bottom side. A plurality of ramps 17' may be affixed to the top side of the ramp strips, and positioned to have inclined plane surfaces that contact corresponding inclined plane surfaces of ramps 14' on the bottom side of tray 12'. Corresponding contacting ramps of the respective groups 14' and 17' form a plurality of ramp pairs.

As described above, the ramp pair structure provides a mechanism that, in response to a displacement along ramp pair contact interfaces, provides a movement having components along the x-axis and y-axis. However, it should be appreciated that in the embodiment illustrated in FIG. 4, movement of the ramp strips accounts for the x component of the movement. Accordingly, since the ramp strips 44 may move independently of the tray 12', the tray 12' may experience movement only along the y-axis when the ramp strips are displaced along the x-axis.

It should be appreciated that the ramp pairs may be arranged in either direction such that movement of ramp strips 44 along the x-axis forces movement of the tray 12' along the y-axis in a direction having either a same or opposite sign. In addition, the characteristics of ramps 14' and ramps 17' (e.g., the slope of the inclined surfaces) in a ramp pair may be chosen to provide any desired ratio between the degree of x-component and y-component movement effected by a displacement along the ramp pair contact interface.

By arranging ramps 17' on ramp strips 44, and by providing the ramp strips with a degree of freedom along the x-axis, plate 4 may be moved in the y-direction without experiencing any movement in the x-direction. In this manner, the contact between plate 4 and window 11 can be disengaged before the plate experiences any motion other than motion in a direction parallel to the y-axis. Accordingly, any rubbing forces may be substantially or entirely eliminated. Once the plate has been disengaged from the window, it may be independently forced towards opening 16 and into a loading position.

In one embodiment, ramp strips 44 are coupled to springs that provide a force against the ramp strips which tends to move the ramp strips along the x-axis in a direction that results in the tray 12' moving toward an extreme in the y-direction (i.e., the springs tend to return the tray to the set position).

As illustrated in the embodiment of FIG. 4, a beam 47 may be coupled to the ramp strips 44. When the cassette is not engaged with an image reader, beam 47 may block opening 16 to prevent light from entering the cassette and to insure that the plate cannot unintentionally exit the cassette, for example, in the event of rough handling or accidental drops. When inserted into a loader of an image reader, the beam may receive a force from a loader (e.g. see FIGS. 6 and 7) to provide a displacement along the ramp contact interfaces, which, in turn, disengages the contact between plate 4 and the window 11.

In the embodiment illustrated in FIG. 4, beam 47 may include pins that can be mechanically engaged by corresponding elements of the loader (not shown) to provide an inward force on the beam. It should be appreciated that a variety of methods may be used to provide a force to the ramp strips 44 such that a displacement along the ramp pair contact interfaces is effected.

In the embodiment of FIG. 4, a plate scraper 42 is positioned proximate the bottom side of the tray 12'. The plate scraper 42 may be positioned in a scraper channel 45 of the cassette bottom side wall 15 adapted to constrain the movement of the plate scraper to movement along the x-axis. Plate scraper 42 may be a rectangular strip having an essentially flat surface and a top and a bottom side. Plate scraper 42 may include a lip 49 along one of its ends. Plate scraper 42 also may include a mechanical interface 19' on the bottom side as illustrated in the cut-away of the plate scraper in layer (c) of FIG. 4.

Scraper channel 45 may include a slot 18' that allows a positioning member to engage the mechanical interface 19' on the bottom side of the scraper. The plate scraper 42 may be positioned beneath the tray such that lip 49 protrudes above the plane of tray 12' via recess 43. The relationship between the lip 49 and the recess 43 in an assembled cassette is illustrated in layer (b) of FIG. 4.

When plate 4 is inserted in the cassette and is in a set position, lip 49 is in contact with a trailing edge of the plate 4. Accordingly, movement of the plate scraper 42 along the x-axis causes the plate 4 to move along the surface of the tray towards the opening 16. As discussed in greater detail below, the plate may be moved along the y-axis (via the movement of the tray corresponding to the ramp pair interaction) and along the x-axis (via the plate scraper 42) independently, therefore ensuring that the plate does not rub against the window during transfer to and from the cassette.

Figure 5:
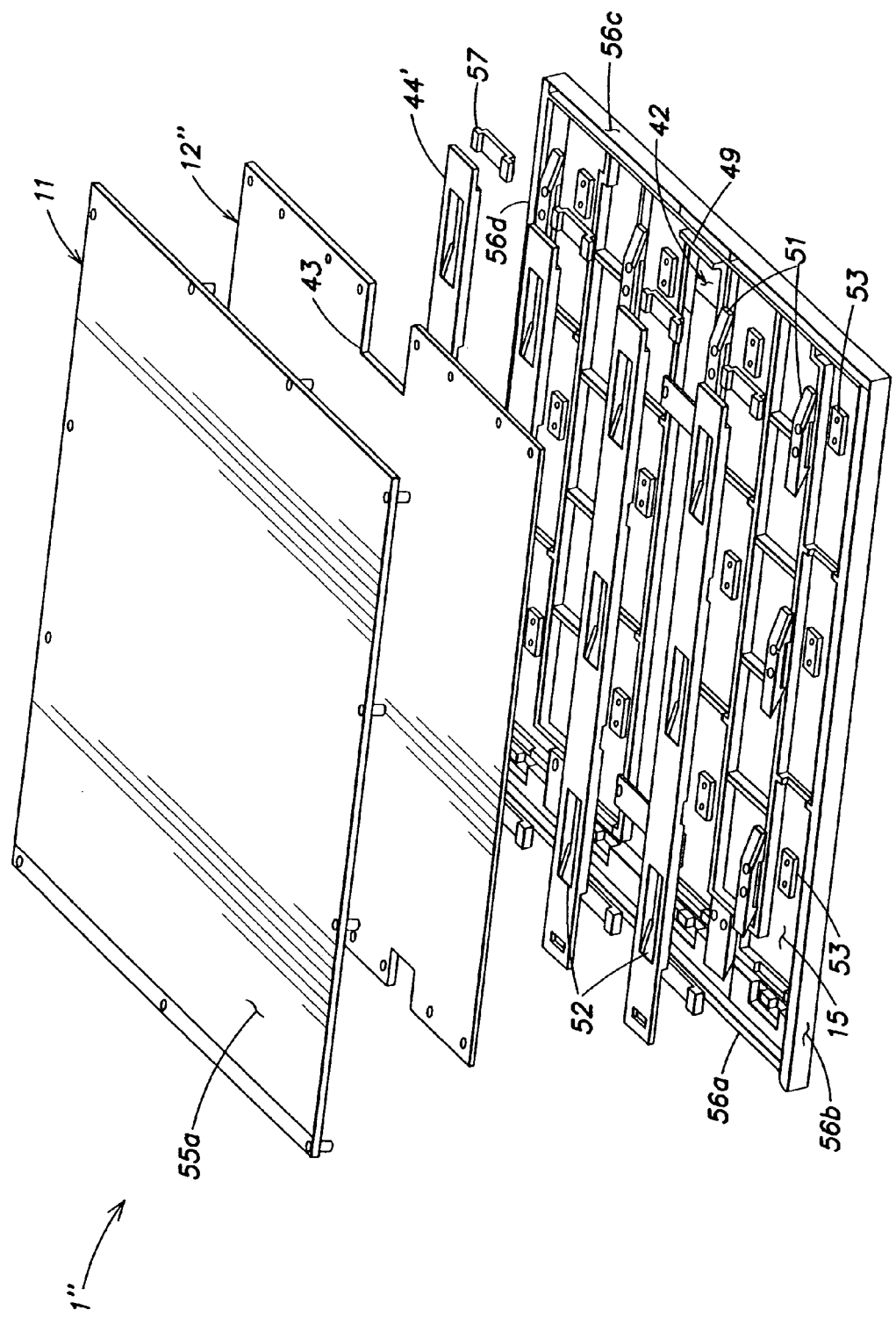
FIG. 5 illustrates an exploded view of a cassette, according to another embodiment of the invention.

FIG. 5 illustrates another embodiment of a cassette 1" according to the present invention. The cassette 1" illustrated in FIG. 5 provides, inter alia, an alternative embodiment of the ramp mechanisms described in connection with FIGS. 1a, 1b, and 4. Cassette 1" has two essentially flat sides 55a and 55b and four narrow edges 56a, 56b, 56c and 56d. In one embodiment, an image recording medium is extracted from and inserted into cassette 1" through an opening in narrow edge 56a.

As illustrated in FIG. 5, tray 12" is not formed with any ramps affixed directly thereto as in previous embodiments. Tray 12" includes an essentially flat surface and a recess 43 along one of its edges. Cassette 1" includes a plurality of male ramp elements 51. The body of the male ramp element may be a parallelogram having a pair of inclined plane surfaces and a pair of level plane surfaces. A first level plane surface may be affixed to the bottom side wall 15 of cassette 1", or to a mount 53 fastened to the bottom side wall of the cassette.

Ramp strips 44' include a plurality of female ramp elements 52 adapted to couple with the male ramp elements 51. Each female ramp element includes a pair of inclined plane surfaces. The two inclined plane surfaces of the female ramp element are separated by a space adapted to accommodate the body of a corresponding male ramp element. When a female and a male ramp element are mated in a parallelogram coupling, corresponding inclined plane surfaces form a pair of inclined plane contact interfaces.

In the embodiment of FIG. 5, each parallelogram coupling includes a first and a second ramp pair. Any displacement along the contact interfaces (i.e., any change in the parallelogram coupling) causes a movement having an x and a y component. The desired ratio between the degree of the x and y component of the movement corresponding to a given displacement along the ramp pair contact interfaces may be achieved by appropriately choosing the slope of the inclined plane surfaces of the male and female ramp elements, as discussed above.

In FIG. 5, when tray 12" is in a set position, it is supported underneath by the ramp strips 44'. When a force causes the ramp strips to displace along the inclined plane contact surfaces, ramp strips 44' experience a displacement in the x and y-direction. Since the ramps strips 44' support the tray but may move independently of the tray, the tray may undergo a corresponding displacement in the y-direction only. This displacement of the tray disengages the contact between an image recording medium, such as plate 4, and the window 11. It should be appreciated that the movement of the ramp strips in the x-direction is not shared by the tray. For example, ramp strips 44' may be held proximate to the tray by u-brackets 57 that allow the ramp strips to move along the x-axis independently of the tray. Furthermore, the tray may be constrained by the cassette by some means to prevent its movement in the x-direction.

The force applied to the ramp strips may come from a variety of mechanisms. As discussed above in connection with the embodiment illustrated in FIG. 4, the ramp strips 44' may be coupled to a beam which receives a force from the loader of an image reader when the cassette is inserted into the loader. The beam may be positioned such that when the cassette is in the set position, the beam blocks opening 16. The beam, fixed to the ramp strips, is subject to the same movement in the x and y direction when displacement is effected along the ramp pair contact interfaces.

Accordingly, the beam is moved inward and downward unblocking opening 16 to allow the plate to exit the cassette. In addition, springs may be coupled to the ramp strips and the beam such that the springs provide a force which tends to return the ramp strips, and subsequently the tray, to its maximum y-direction position (i.e., the springs tend to return the cassette to the set position).

Figure 6:
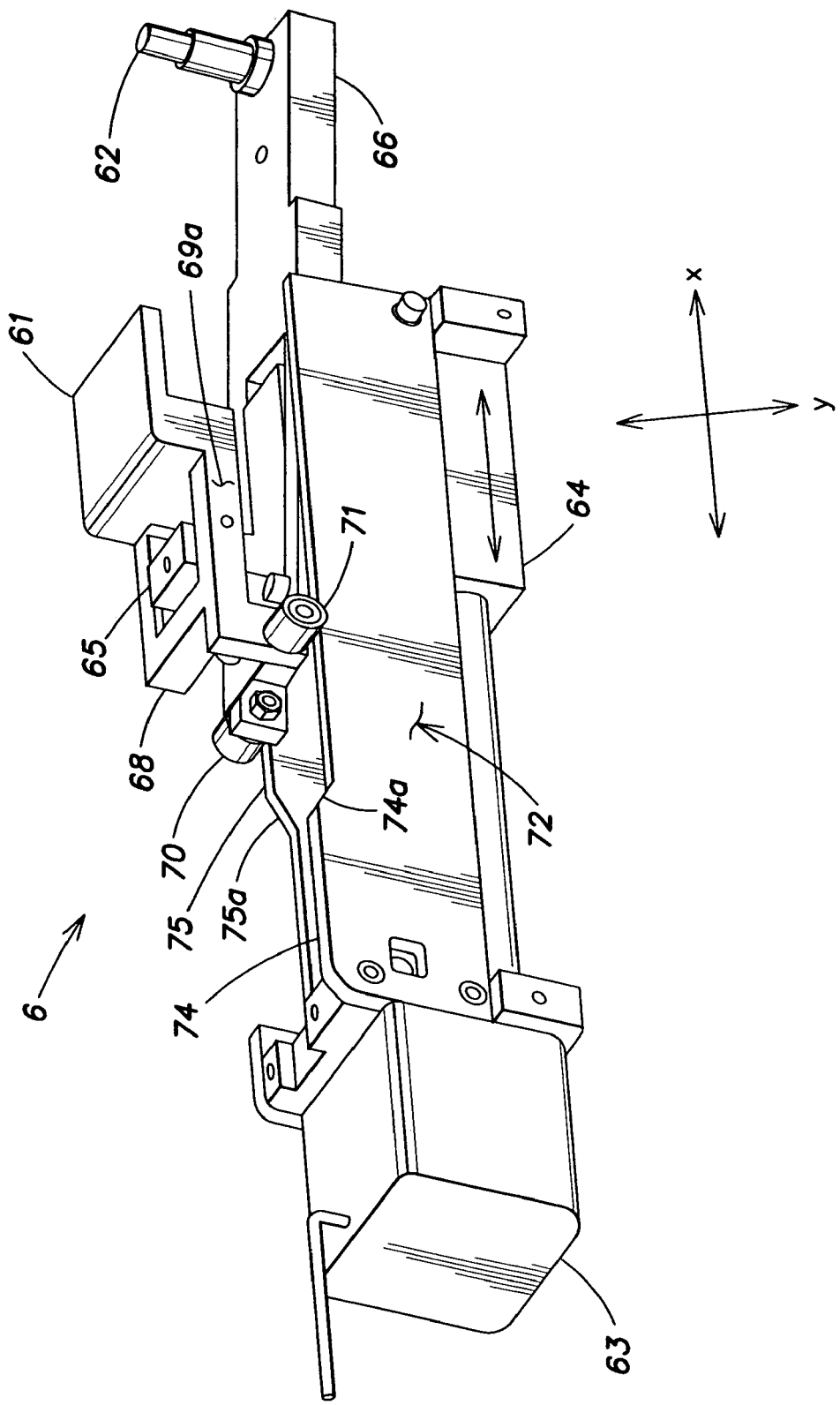
FIG. 6 illustrates a first view of a portion of the image reader of FIG. 2, according to one embodiment of the invention.
Figure 7:
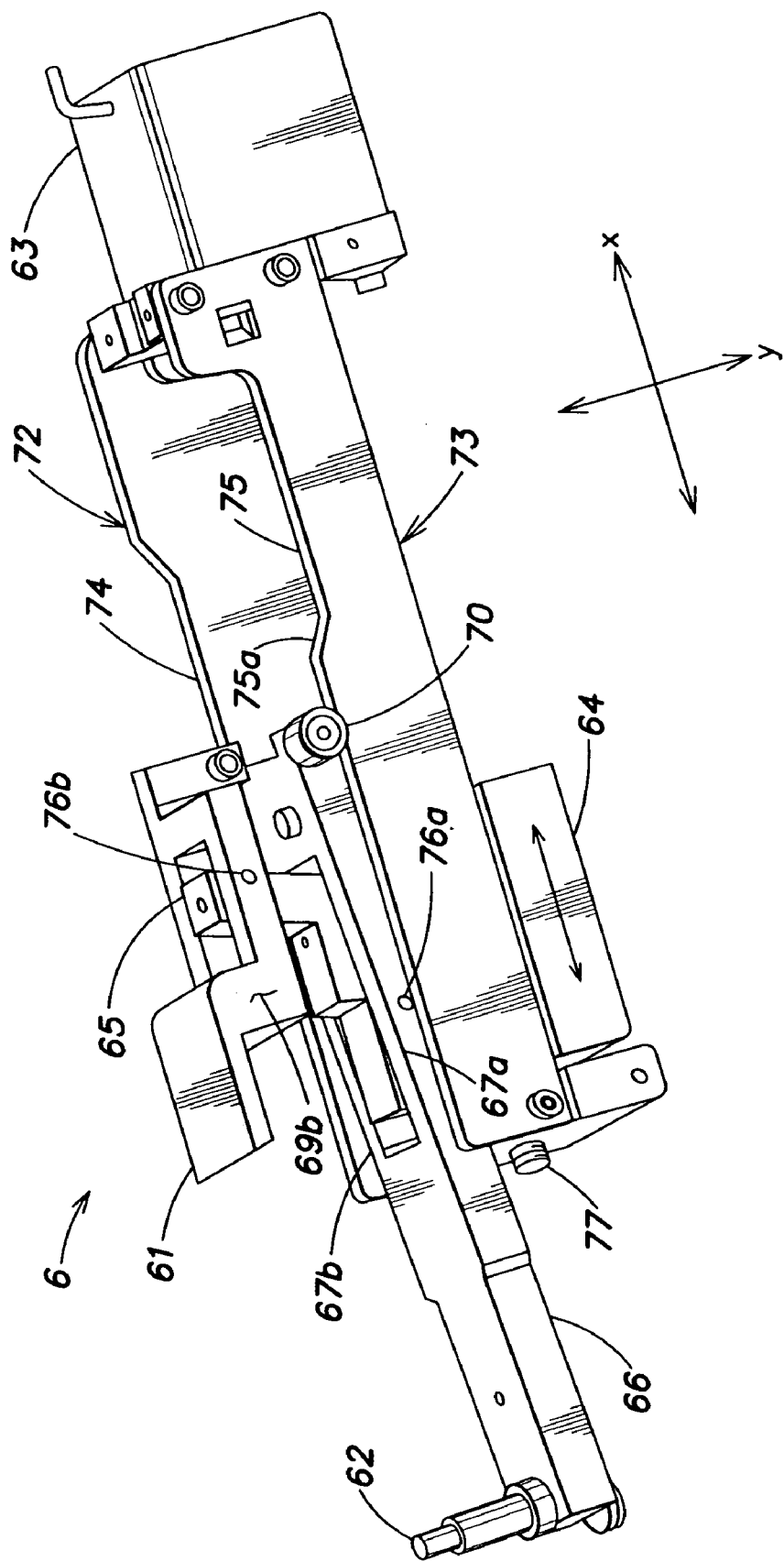
FIG. 7 illustrates a second view of a portion of the image reader of FIG. 2, according to one embodiment of the invention.

FIGS. 6 and 7 illustrate two views of an automatic loader according to one embodiment of the present invention. The automatic loader of FIGS. 6 and 7 may be used to extract an image recording medium from any of the various embodiments of cassettes illustrated in FIGS. 1a, 1b, 4 and 5.

Automatic loader 6 includes a tongue 61 and a positioning member 62 for guiding an image recording medium into and out of a cassette. Automatic loader 6 further includes a motor 63, for example, a stepper motor. Motor 63 rotates lead screw 77 (shown in FIG. 7). A moveable cart 64 is mechanically coupled to the lead screw such that as the lead screw rotates, the cart is caused to translate along the x-axis in a direction corresponding to the rotation of the screw.

The cart 64 includes a central member 65 that supports and constrains, in part, the tongue and the positioning member while allowing for a rotational degree of freedom around a pair of connecting pins 76a and 76b (see FIG. 7). In the embodiment of FIGS. 6 and 7, the central member 65 has a profile having a first, a second, and a third step portion respectively increasing in height.

As best shown by the view illustrated in FIG. 7, positioning member 62 is disposed at a first end of an extended arm 66. A second end of the arm includes two spaced-apart prongs 67a and 67b that allow the first portion of the central member to be positioned between them. A first pin 76a connects the two prongs to the central member allowing a rotational degree of freedom about the pin. This rotational degree of freedom allows the positioning member to be raised and lowered as desired. A first wheel 70 is connected to prong 67a at an end away from the positioning member.

As best shown by the view illustrated in FIG. 6, tongue 61 extends from a base 68 having two sides 69a and 69b separated by an opening to allow the third step portion of the central member to be positioned between the two sides. The two sides are connected to the third portion of the central member by a second pin 76b (FIG. 7) that allows a rotational degree of freedom about the pin. This rotational degree of freedom allows the tongue to be raised and lowered as desired. A second wheel 71 is connected to an extended portion of side 69a.

The automatic loader further includes a pair of path guides 72 and 73. Path guide 72 includes a contoured guide rail 74 on one edge that defines a predetermined path for the tongue. Similarly, path guide 73 includes a contoured guide rail 75 on one edge that defines a predetermined path for the positioning member. As illustrated in FIG. 6, the second wheel connected to the extended portion of the base of the tongue is supported by the contoured guide rail 74. Similarly, the first wheel connected to prong 67a is supported by the contoured guide rail 75.

As the motor moves the cart along the x-axis, the first and second wheels follow the contour of the guide rails causing their respective parts (e.g., the positioning member and the tongue, respectively) to rotate about the first and second pins according to elevation changes defined by the contours. Accordingly, as the wheels change position in the y-direction, the respective parts undergo a change in position in the y-direction having the opposite sign. It should be appreciated that by choosing an appropriate contour for each guide rail, the tongue and the positioning member may be raised and lowered independently according to a desired pattern and according to a desired timing schedule. In this manner, the geometry of the guide paths determine the timing of certain events as described in further detail below.

The operation of transferring an image recording medium from a cassette to an image reader will now be described with reference to the automatic loader illustrated in FIGS. 6 and 7 and the cassette embodiments illustrated in FIGS. 4 and 5. Elements of the cassette will be referenced generally without reference numerals and should be considered appropriate to any of the various cassette embodiments discussed herein, unless specifically stated otherwise.

When a cassette is inserted into the automatic loader, a beam is forced inward and downward exposing the opening. The beam applies a force on ramp strips in the x-direction which causes a displacement along the contact surface of the inclined plane surfaces of the ramps. As discussed in connection with the embodiments of FIGS. 4 and 5, the displacement along ramp pair contact interfaces causes the tray to move along the y-axis in a direction that removes the contact between the image recording medium and the window.

A locking mechanism on the loader (not shown) may prevent the cassette from being removed from the loader and prevents the beam and ramp strips from returning to the set position. When the cassette is locked into the loader, the positioning member is disposed below the bottom side of the cassette. The motor begins to pull the cart in a negative x-direction. At a first instant, the wheel attached to the arm of the positioning member reaches the decline of contour 75a of contoured guide rail 75, and the arm rotates about the first pin raising the positioning member. As the positioning member is raised, it penetrates the slot on the bottom side of the cassette and engages the mechanical interface on the bottom side of the plate scraper. The engaged positioning member causes the plate scraper to move along the x-axis. The lip of the plate scraper is engaged with a trailing edge of the image recording medium and forces the image recording medium to move in correspondence towards the opening on the front edge of the cassette.

At a second instant some predetermined time after the first instant, the wheel attached to the tongue base reaches the incline of contour 74a of contoured guide rail 74, and the tongue rotates about the second pin lowering the tongue. As the plate is pulled through the opening by the positioning member, the tongue has been lowered such that the plate passes over it. Rollers, such as those illustrated in FIG. 2, catch the leading edge of the plate and pull the plate into the interior of the image reader. The motor stops the movement of the cart until the plate has been scanned by the image reader. Once the plate has been scanned, the rollers push the plate back over the tongue and into the cassette. The motor begins rotating the lead screw in the opposite direction forcing the cart towards the cassette. The engaged positioning member is now pushing the plate scraper back towards its set position.

At a third instant, the second wheel reaches the decline of the contour 74a, raising the tongue. As the leading edge of the plate passes over the tongue, the tongue is raised such that it is in contact with the leading edge of the plate. As the cart progresses towards the cassette, the tongue pushes the plate back into the cassette. At a fourth instant, the first wheel reaches the incline of contour 75a, lowering the positioning member such that it disengages the mechanical interface of the plate scraper as the plate is pushed back into the cassette by the tongue.

The locking mechanism may then be disengaged from the springs coupled to the ramp strips and the beam released. The spring force causes a displacement along the contact interfaces of the ramp pairs or parallelogram couplings, forcing the tray in the positive y-direction. The beam is returned to its position blocking the opening and contact between the image recording medium and the window is restored. The cassette is ready to be removed from the automatic loader and again exposed to radiation for subsequent image recording.

Having thus described several illustrative embodiments of the invention, various alterations, modifications, and improvements will readily occur to those skilled in the art. Such alterations, modifications, and improvements are intended to be within the spirit and scope of the invention. While some examples presented herein involve specific combinations of functions or structural elements, it should be understood that those functions and elements may be combined in other ways according to the present invention to accomplish the same or different objectives. In particular, acts, elements and features discussed in connection with one embodiment are not intended to be excluded from a similar or other roles in other embodiments. Accordingly, the foregoing description is by way of example only, and is not intended as limiting.

Use of ordinal terms such as "first," "second," "third," etc., in the claims to modify a claim element does not by itself connote any priority, precedence, or order of one claim element over another or the temporal order in which acts of a method are performed. Rather, these terms are used merely as labels to distinguish one claim element having a certain name from another element having a same name (but for use of the ordinal term) to distinguish the claim elements.

What is claimed is:

1. An apparatus to handle at least one image recording medium, comprising:
   a substantially flat housing including two essentially parallel sides having similar dimensions, the housing further including a plurality of relatively smaller-dimensioned edges, at least one edge of the housing including an opening configured to allow passage of the at least one image recording medium into and out of the housing;
   at least one radiation conversion device disposed in the housing and configured to attenuate first radiation incident to the apparatus such that at least some of the first radiation, when present, is converted by the at least one radiation conversion device to provide second radiation, the second radiation having a lower energy than the first radiation, wherein the at least one radiation conversion device includes a first essentially flat surface;
   at least one element disposed in the housing and adapted to facilitate automatic transfer of the at least one image recording medium into and out of the housing via the opening, wherein the at least one element further is adapted to facilitate placement of the at least one image recording medium, when handled by the apparatus, in a position of alignment with the at least one radiation conversion device such that at least some of the second radiation impinges on the at least one image recording medium;
   wherein the at least one image recording medium to be handled by the apparatus includes a second essentially flat surface; and the at least one element further is adapted to facilitate placement of the second essentially flat surface in contact with the first essentially flat surface; and
   the apparatus further including at least one positioning mechanism adapted to reduce a rubbing of the first and second essentially flat surfaces during the placement of the at least one image recording medium.

2. The apparatus of claim 1, wherein:
   the at least one element includes at least one movable element; and
   the at least one positioning mechanism is adapted to facilitate a movement of the at least one movable element so as to place the second essentially flat surface in contact with the first essentially flat surface.

3. The apparatus of claim 2, wherein the at least one image recording medium, when handled by the apparatus, is disposed between the at least one radiation conversion device and the at least one movable element.

4. The apparatus of claim 3, wherein the at least one positioning mechanism is adapted to facilitate a movement of the at least one movable element in a direction perpendicular to the first and second essentially flat surfaces.

5. The apparatus of claim 3, wherein the at least one positioning mechanism is adapted to facilitate a movement of the at least one movable element simultaneously in a first direction parallel to the first and second essentially flat surfaces and a second direction perpendicular to the first and second essentially flat surfaces.

6. The apparatus of claim 3, wherein the at least one positioning mechanism is adapted to facilitate a movement of the at least one movable element consecutively in a first direction parallel to the first and second essentially flat surfaces and a second direction perpendicular to the first and second essentially flat surfaces.

7. The apparatus of claim 3, wherein the at least one movable element includes at least one essentially flat tray, and wherein the positioning mechanism includes:
at least one first ramp coupled to one side of the at least one essentially flat tray; and
at least one second ramp coupled to one of the two essentially parallel sides of the housing, the at least one second ramp and the at least one first ramp being adapted to mechanically engage with each other so as to facilitate the placement of the at least one image recording medium.

8. The apparatus of claim 7, wherein each of the at least one first and second ramps has a slope of less than 45 degrees with respect to the at least one essentially flat tray.

9. The apparatus of claim 8, wherein each of the at least one first and second ramps has a slope of approximately 15 degrees with respect to the at least one essentially flat tray.

10. The apparatus of claim 7, wherein the positioning mechanism further includes at least one receiving portion of the at least one essentially flat tray that is adapted to mechanically engage with a positioning member, the positioning member being operable to facilitate a movement of the at least one essentially flat tray in the apparatus.

11. The apparatus of claim 2, wherein the at least one moveable element includes at least one first moveable element capable of being moved in a first direction and at least one second moveable element capable of being moved in at least a second direction essentially perpendicular to the first direction.

12. The apparatus of claim 11 wherein the at least one positioning mechanism is adapted to facilitate movement of at least the at least one first moveable element in the first direction.

13. The apparatus of claim 12, wherein the first direction is perpendicular to the first essentially flat surface of the at least one radiation conversion device.

14. The apparatus of claim 13, wherein the apparatus is arranged such that movement of the at least one second moveable element in the second direction causes the at least one first moveable element to move in the first direction.

15. The apparatus of claim 13, wherein the at least one positioning mechanism includes at least one ramp pair, each ramp pair having a first and a second ramp, the first and second ramps having a first and a second inclined plane surface, respectively.

16. The apparatus of claim 15, wherein in each ramp pair is arranged such that first and second surface normals to the first and second inclined plane surfaces are essentially supplementary.

17. The apparatus of claim 16, wherein the first ramp in each ramp pair is coupled to the at least one first moveable element.

18. The apparatus of claim 17, wherein the at least one first moveable element is an essentially flat tray adapted to support the at least one image recording medium.

19. The apparatus of claim 18, wherein the first ramp in each ramp pair is coupled directly to one side of the essentially flat tray.

20. The apparatus of claim 19, wherein the second ramp in each ramp pair is coupled to the at least one second moveable element.

21. The apparatus of claim 20, wherein the at least one second moveable element includes at least one rectangular strip having the second ramp in each ramp pair formed thereon.

22. The apparatus of claim 18, wherein
the first ramp in each ramp pair is formed in the at least one second moveable element; and
the at least one second moveable element is coupled to one side of the essentially flat tray.

23. The apparatus of claim 22, wherein the at least one second moveable element is formed as a rectangular bracket.

24. The apparatus of claim 23, wherein the first ramp in each ramp pair is formed as a female ramp in the rectangular bracket.

25. The apparatus of claim 24, wherein the second ramp in each ramp pair is formed as a male ramp coupled to the housing, the male ramp being configured to engage with a corresponding female ramp.

26. A method for handling at least one image recording medium, comprising the acts of:
a) automatically transferring the at least one image recording medium into or out of a substantially flat housing including two essentially parallel sides having similar dimensions, the housing further including a plurality of relatively smaller-dimensioned edges, at least one edge of the housing including an opening through which the at least one image recording medium is passed; act a) including an act of;
a1) placing the at least one image recording medium in a position of alignment within the housing such that at least some of the second radiation impinges on the at least one image recording medium, and
b) attenuating first radiation incident to the housing such that at least some of the first radiation, when present, is converted to provide second radiation having a lower energy than the first radiation;
wherein the act b) is performed by a radiation attenuator, and wherein the act a1) further includes acts of:
a2) placing the at least one image recording medium in a position of contact alignment with the radiation attenuator; and
a3) reducing a rubbing of the radiation attenuator and the at least one image recording medium during the act a2).

27. A method for handling at least one image recording medium, comprising the acts of:
a) automatically transferring the at least one image recording medium into or out of a substantially flat housing including two essentially parallel sides having similar dimensions, the housing further including a plurality of relatively smaller-dimensioned edges, at least one edge of the housing including an opening through which the at least one image recording medium is passed; act a) including an act of;
a1) placing the at least one image recording medium in a position of alignment within the housing such that at least some of the second radiation impinges on the at least one image recording medium; and b) attenuating first radiation incident to the housing such that at least some of the first radiation, when present, is converted to provide second radiation having a lower energy than the first radiation;

wherein the act b) is performed by a radiation attenuator having an essentially flat surface, and wherein the act a1) includes an act of:

moving the at least one recording medium simultaneously in a first direction parallel to the essentially flat surface and a second direction perpendicular to the essentially flat surface.

28. A method for handling at least one image recording medium, comprising the acts of:
   a) automatically transferring the at least one image recording medium into or out of a substantially flat housing including two essentially parallel sides having similar dimensions, the housing further including a plurality of relatively smaller-dimensioned edges, at least one edge of the housing including an opening through which the at least one image recording medium is passed; act a) including an act of;
   a1) placing the at least one image recording medium in a position of alignment within the housing such that at least some of the second radiation impinges on the at least one image recording medium; and
   b) attenuating first radiation incident to the housing such that at least some of the first radiation, when present, is converted to provide second radiation having a lower energy than the first radiation;
   wherein the act b) is performed by a radiation attenuator having an essentially flat surface, and wherein the act a1) includes an act of:
   moving the at least one recording medium consecutively in a first direction parallel to the essentially flat surface and a second direction perpendicular to the essentially flat surface.

29. An apparatus to handle at least one image recording medium, comprising:
   at least one radiation attenuator configured to attenuate first radiation incident to the apparatus such that at least some of the first radiation, when present, is attenuated to provide second radiation, the second radiation having a lower energy than the first radiation; and
   at least one element adapted to facilitate automatic transfer of the at least one image recording medium into and out of the apparatus, the at least one element further adapted to facilitate placement of the at least one image recording medium, when handled by the apparatus, in a position of alignment with the at least one radiation attenuator such that at least some of the second radiation impinges on the at least one image recording medium; wherein the at least one element includes:
   at least one first moveable element adapted to support the at least one image recording medium, the at least one first moveable element adapted for movement along a first axis; and
   at least one second moveable element adapted for movement along at least a second axis essentially perpendicular to the first axis,
   wherein the apparatus is configured such that a movement of the at least one second moveable element along the second axis causes movement of the at least one first moveable element along the first axis.

30. The apparatus of claim 29, wherein the apparatus is configured such that a first movement of the at least one first moveable element in a first direction along the first axis engages contact between the at least one recording medium and the at least one radiation attenuator, and such that a second movement of the at least one first moveable element in a second direction along the first axis disengages contact between the at least one recording medium and the at least one radiation attenuator.

31. The apparatus of claim 30, wherein the apparatus is configured such that the first and second movements substantially prevent a rubbing of the image recording medium against the at least one radiation attenuator during transfer of the image recording medium into and out of the apparatus.

32. The apparatus of claim 30, wherein the at least one second moveable element causes movement of the at least one first moveable element via at least one ramp pair, each ramp pair having a first ramp coupled to the at least one first moveable element and a second ramp coupled to the at least one second moveable element.

33. A method of handling at least one image storage medium, comprising an act of:
   (a) automatically placing the at least one image storage medium into and out of a position of alignment with at least one radiation conversion device that attenuates an energy of radiation incident to the at least one radiation conversion device, such that at least some of the radiation, when present, passes through the at least one radiation conversion device and impinges on the at least one image recording medium, wherein the act (a) includes an act of;
   (b) automatically placing the at least one image storage medium into and out of a position of contact with the at least one radiation conversion device,
   wherein the act (b) includes an act of:
   substantially preventing a rubbing of the at least one image storage medium and the at least one radiation conversion device.

34. A method of handling at least one image storage medium, comprising an act of:
   (a) automatically placing the at least one image storage medium into and out of a position of alignment with at least one radiation conversion device that attenuates an energy of radiation incident to the at least one radiation conversion device, such that at least some of the radiation, when present, passes through the at least one radiation conversion device and impinges on the at least one image recording medium, wherein the act (a) includes an act of:
   (b) automatically placing the at least one image storage medium into and out of a position of contact with the at least one radiation conversion device,
   wherein the at least one radiation conversion device includes an essentially flat surface, and wherein the act (b) includes an act of;
   moving the at least one image storage medium consecutively in a first direction parallel to the essentially flat surface and a second direction perpendicular to the essentially flat surface.

35. A method of handling at least one image storage medium, comprising an act of:
   (a) automatically placing the at least one image storage medium into and out of a position of alignment with at least one radiation conversion device that attenuates an energy of radiation incident to the at least one radiation conversion device, such that at least some of the radiation, when present, passes through the at least one radiation conversion device and impinges on the at least one image recording medium, wherein the act (a) includes an act of;

(b) automatically placing the at least one image storage medium into and out of a position of contact with the at least one radiation conversion device,
wherein the at least one radiation conversion device includes an essentially flat surface, and wherein the act (b) includes an act of:

moving the at least one image storage medium simultaneously in a first direction parallel to the essentially flat surface and a second direction perpendicular to the essentially flat surface.

* * * * *